(12) United States Patent
Xiao et al.

(10) Patent No.: US 8,634,816 B2
(45) Date of Patent: Jan. 21, 2014

(54) LIMITING MOBILE DEVICE SERVICES IN AN AUTOMOBILE

(75) Inventors: Hong Xiao, Acton, MA (US); Dongchen Wang, Concord, MA (US); Andre R. Turner, Belmont, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 67 days.

(21) Appl. No.: 13/193,042

(22) Filed: Jul. 28, 2011

(65) Prior Publication Data
US 2013/0029650 A1 Jan. 31, 2013

(51) Int. Cl.
*H04M 3/42* (2006.01)

(52) U.S. Cl.
USPC .................. 455/417; 455/567; 455/569.2

(58) Field of Classification Search
USPC ............................ 455/417, 569.1, 569.2, 567
See application file for complete search history.

(56) References Cited

U.S. PATENT DOCUMENTS

2011/0105097 A1* 5/2011 Tadayon et al. ............... 455/418

FOREIGN PATENT DOCUMENTS

WO    WO 2009105666 A1 *  8/2009 ............ H04W 48/04

* cited by examiner

*Primary Examiner* — Vladimir Magloire

(57) ABSTRACT

A method may include determining whether a mobile communication device is in a driver compartment of an automobile. The method may include determining whether the automobile is in motion or not in motion. Further, the method may include redirecting a call to the mobile communication device when the mobile communication device is in the driver compartment and the automobile is in motion.

25 Claims, 14 Drawing Sheets

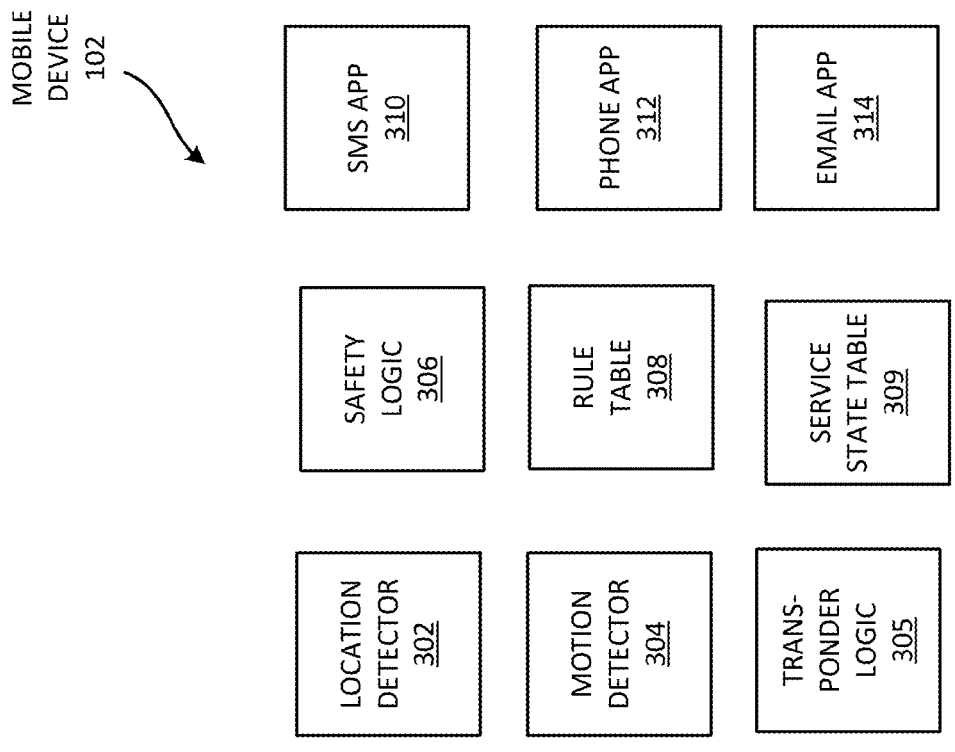

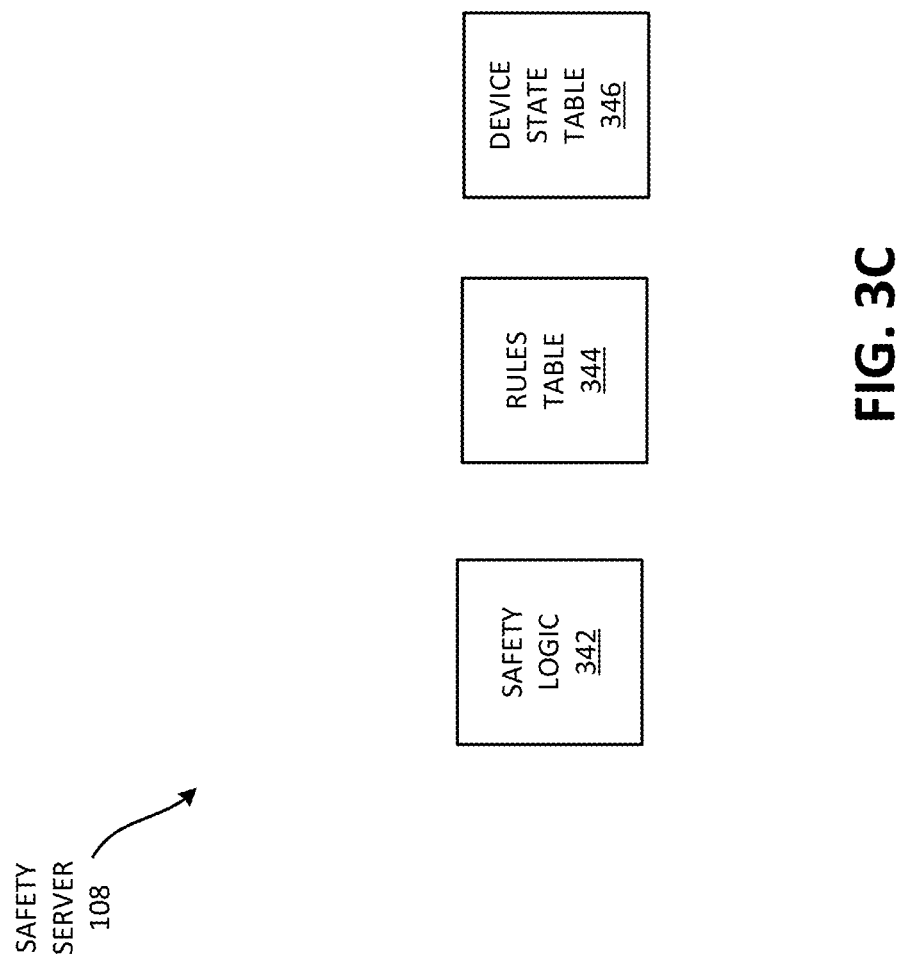

RULE TABLE 308 / 344
(FOR MOBILE DEVICE 102)

| SPEED 452 | DISTANCE FROM TRANSPONDER 454 | LOCATION 456 | HEADSET USED? 458 | SAFETY SETTINGS 460 |
|---|---|---|---|---|
| > 5 MPH | < 3 FEET | NEW JERSEY | YES | SMS APP=OFF (EXCEPT EMERGENCY); PHONE APP=OFF (EXCEPT EMERGENCY); DATA=ON. |
| > 5 MPH | < 3 FEET | NEW JERSEY | NO | SMS APP=OFF (EXCEPT EMERGENCY); PHONE APP=OFF (EXCEPT EMERGENCY); DATA=ON; CALLS FORWARDED TO MOBILE DEVICE 406 IF IN CAR 104 |

SERVICE STATE TABLE 309

| SERVICE 492 | STATE 494 |
|---|---|
| SMS APP | OFF (EXCEPT EMERGENCY) |
| PHONE APP | ON |
| ⋮ | ⋮ |

FIG. 4D

DEVICE STATE TABLE 346

| DEVICE ID 482 | STATE 484 |
|---|---|
| 201-891-7329 (MOBILE DEVICE 102) | SMS APP=OFF (EXCEPT EMERGENCY); PHONE APP=OFF (EXCEPT EMERGENCY; REROUTE TO MOBILE DEVICE 106 IF IN CAR 104); DATA=ON; IN CAR 104; IN DRIVER COMPARTMENT 110. |
| 202-526-5487 (MOBILE DEVICE 406) | SMS APP=ON; PHONE APP=ON; DATA=ON; IN CAR 104. |
| ⋮ | ⋮ |

LIMITING MOBILE DEVICE SERVICES IN AN AUTOMOBILE

BACKGROUND INFORMATION

Although distracted driving has been identified as a problem, drivers continue to allow themselves to be distracted while driving. The statistics are astonishing. Each day, more than 800,000 Americans "text" (i.e., send or receive text or SMS (short message system) messages) or make phone calls while driving. Over one-third of all young drivers, ages 24 and under, text while driving. Forty-eight percent of young Americans between the ages of 12 and 17 say that they have been in a car while the driver was texting.

The statistics with respect to teens are even more astonishing. Sixty percent of teens admit to texting while driving. Fifty-six percent of teenagers admit to talking on their cell phones while driving. Over 60% of American teens admit to risky driving, and nearly half of those that admit to risky driving also admit to texting while driving. Each year, cell phone use while driving contributed to 21% of fatal car crashes involving teenagers between the ages of 16 and 19.

BRIEF DESCRIPTION OF THE DRAWINGS

FIG. 3A is a block diagram of exemplary components of the car of FIG. 1;

FIG. 3B is a block diagram of exemplary components of the mobile device of FIG. 1;

FIG. 3C is a block diagram of exemplary components of the safety server of FIG. 1;

FIG. 4C is a diagram of an exemplary rule table;

FIG. 4D is a diagram of an exemplary service state table;

FIG. 4E is a diagram of an exemplary device state table;

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Embodiments disclosed herein may determine when it is unsafe for the driver of a car to use some features of his or her mobile communication device. Embodiments may sense or determine unsafe conditions and restrict features of the mobile communication device. Unsafe conditions may include when the mobile communication device is in the driver compartment of a moving car, for example. When it is determined that unsafe conditions are present, some functions (e.g., text messaging or phone calls) may be limited or blocked, for example.

Figure 1:
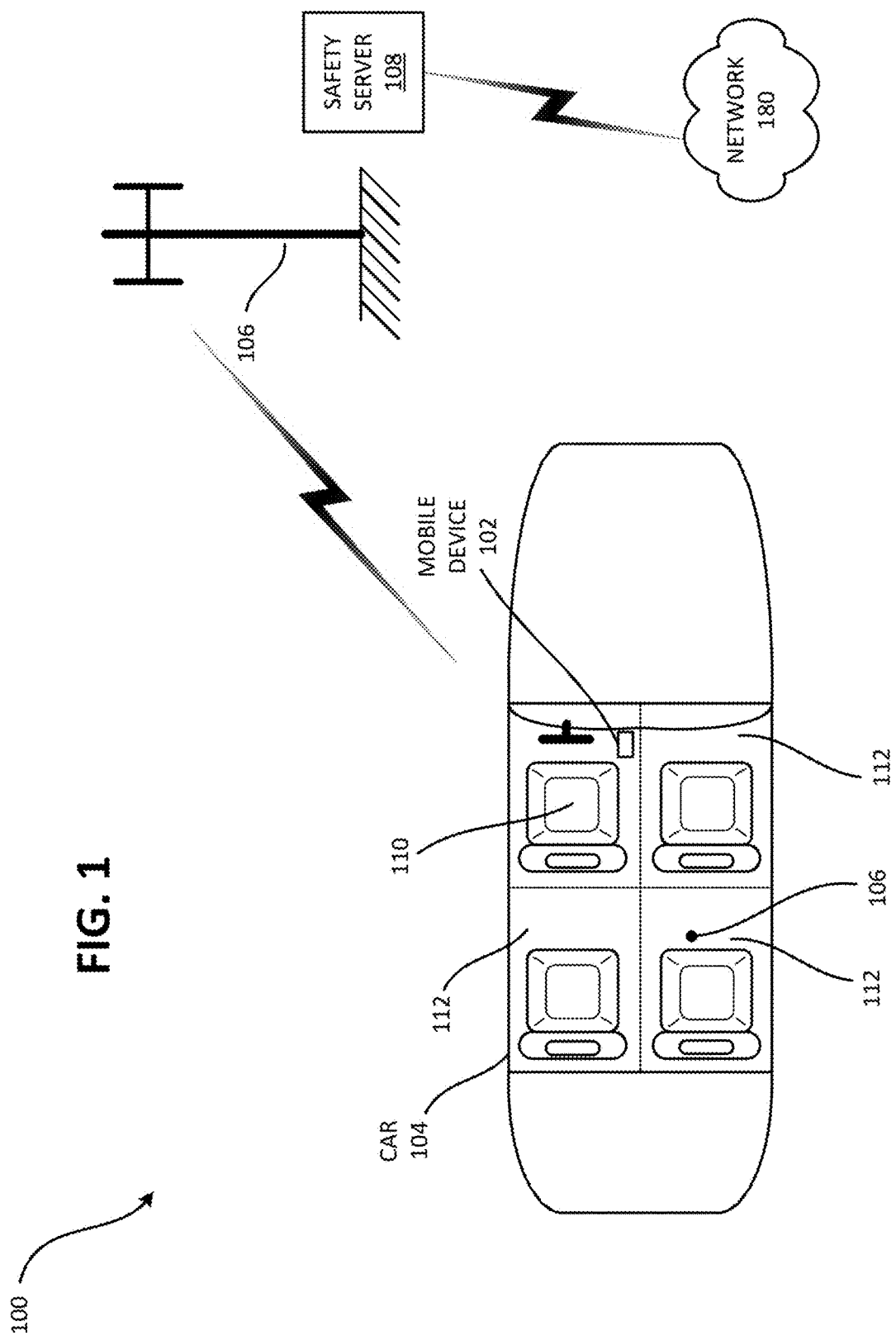
FIG. 1 is a diagram of an exemplary network for implementing the embodiments described herein.

FIG. 1 is a diagram of an exemplary network 100 for implementing embodiments disclosed herein. Network 100 includes a mobile device 102, a car 104, a base station 106, a safety server 108, and a network 180. Safety server 108 and/or mobile device 102 may limit (e.g., turn on or off) services provided to the user of mobile device 102. In one embodiment, services may be limited based on the location of mobile device 102 in the cabin of car 104, for example. In another embodiment, services may be limited based on the speed of car 104 or the location of car 104 (e.g., the legal jurisdiction).

Mobile device 102 may include a mobile phone, a tablet computer, a laptop, a portable digital assistant (PDA), or another portable communication device. In one embodiment, mobile device 102 may be able to receive and send short message service (SMS) messages to other mobile devices in network 100. In one embodiment, mobile device 102 may be able to receive and initiate phone calls to other mobile devices in network 100. In one embodiment, mobile device 120 may download and run applications, including applications from Apple's™ App Store, Amazon's™ Application store for Android, Google's Marketplace for Android devices, Verizon's Application store for Android devices, etc.

Car 104 may include any automobile operated by a driver. In one embodiment, car 104 may carry passengers other than the driver. In the example of FIG. 1, the cabin of car 104 includes a driver compartment 110 as well as three other passenger compartments 112. As the term is used herein, the "driver's compartment" or "driver compartment" means the volume around the driver of car 104 in which the driver can interact with a mobile device, such as mobile device 102. For example, as shown in FIG. 1, mobile device 102 is within reach of a driver of car 104 while driving. Therefore, mobile device 102 in FIG. 1 is in the driver compartment 110. If mobile device 102 were instead at location 106, then mobile device 102 would not be considered in the driver compartment 110 because mobile device 102 would not be within reach of the driver of mobile device 102 while driving.

Base station 106 may facilitate wireless communication (e.g., data traffic, voice traffic, control traffic, etc.) between network 180 and mobile devices, such as mobile device 102. Base station 106 may include an antenna to transmit and receive signals to and from a mobile device. Safety server 108 may include one or more computers for hosting programs and/or databases. In one embodiment, safety server 108 may include a database that stores information regarding whether to forward calls or SMS messages to mobile device 102. For example, if mobile device 102 is within reach of the driver of car 104, then safety server 108 may determine that SMS messages should be held and phone calls should be directed to voicemail while car 104 is moving.

Network 180 may include one or more packet switched networks, such as an Internet protocol (IP) based network, a local area network (LAN), a wide area network (WAN), a personal area network (PAN), an intranet, the Internet, a cellular network (e.g., GSM (Global System for Mobile Communications), CDMA (Code-Division Multiple Access), WCDMA (Wideband CDMA), LTE (Long Term Evolution), IEEE 802.11x, etc.), a fiber-optic network, or another type of network that is capable of transmitting data. Network 180 may include a circuit-switched network, such as a public-switched telephone network (PSTN) for providing telephone services for traditional telephones. Network 180 may allow devices to place and receive telephone calls, send and receive SMS messages, and otherwise connect to other devices also coupled to network 180.

The exemplary configuration of devices in network 100 is illustrated for simplicity. Network 100 may include more devices, fewer devices, or a different configuration of devices than illustrated in FIG. 1. For example, network 100 may include thousands or millions of mobile devices. In some embodiments, the functions performed by two or more devices may be performed by any one device. In addition, any one device may perform the functions described as being performed by any other device. Likewise, in some embodiments, the functions performed by any one device may be performed by multiple devices. Further, the connections shown in FIG. 1 are exemplary. In other embodiments, additional connections that are not shown in FIG. 1 may exist between devices (e.g., each device may be connected to every other device). The connections in FIG. 1 may also be wireless or wired.

Figure 2:
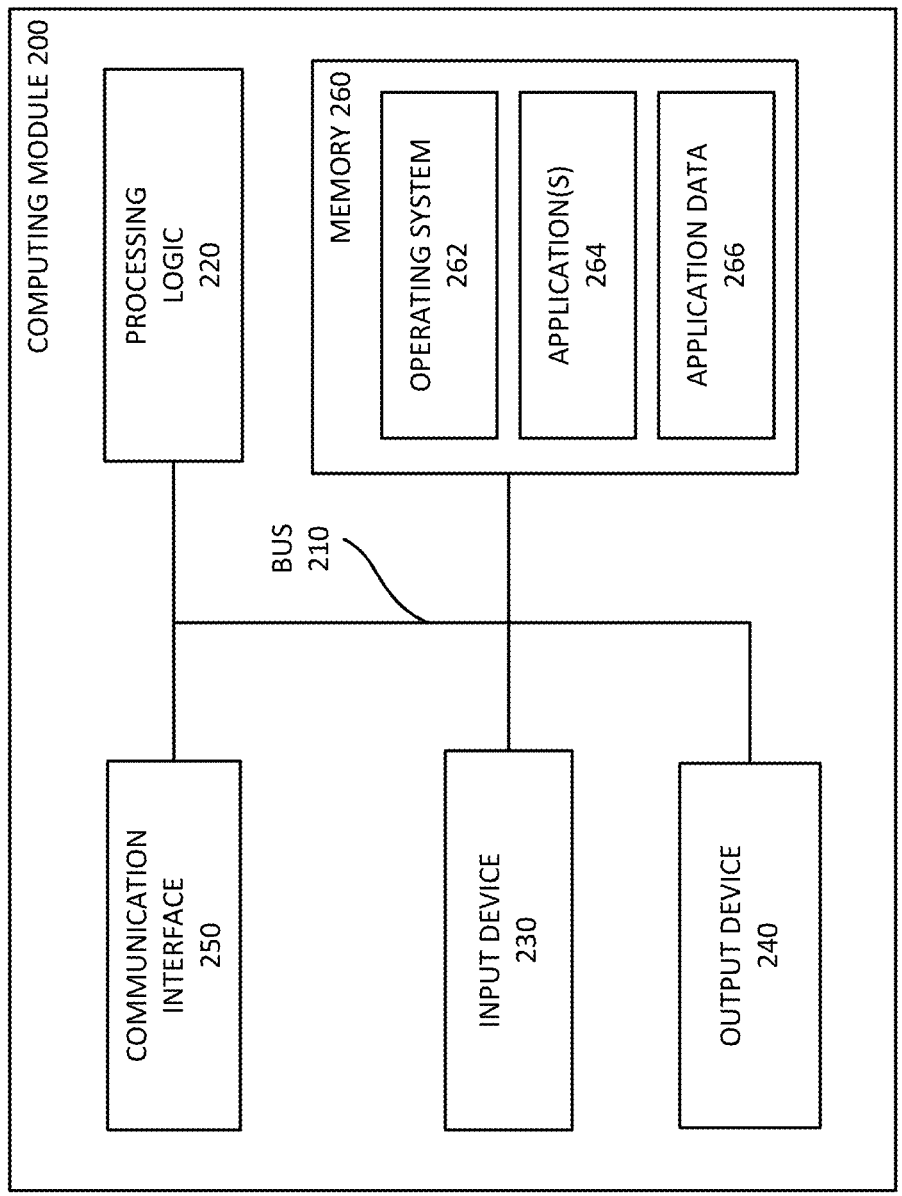
FIG. 2 is a block diagram of exemplary components of a computing module found in the devices of FIG. 1.

Devices in network 100 may each include one or more computing modules. FIG. 2 is a block diagram of exemplary components of a computing module 200. Computing module 200 may include a bus 210, processing logic 220, an input device 230, an output device 240, a communication interface 250, and a memory 260. Computing module 200 may include other components (not shown) that aid in receiving, transmitting, and/or processing data. Moreover, other configurations of components in computing module 200 are possible.

Bus 210 may include a path that permits communication among the components of computing module 200. Processing logic 220 may include any type of processor or microprocessor (or families of processors or microprocessors) that interprets and executes instructions. In other embodiments, processing logic 220 may include an application-specific integrated circuit (ASIC), a field-programmable gate array (FPGA), etc.

Input device 230 may allow a user to input information into computing module 200. Input device 230 may include a keyboard, a telephone keypad, a microphone, an audio capture device, an image and/or video capture device, a touch-screen display, etc. Input device 230 may sense conditions. For example, input device 230 may include an accelerometer, a compass, a global-positioning system (GPS) device, etc. Some devices in network 100, such as safety server 108, may be managed remotely and may not include input device 230. In other words, some devices may be "headless" and may not include a keyboard, for example.

Output device 240 may output information to the user. Output device 240 may include a display, a printer, a speaker, etc. For example, mobile device 102 may include display, which may include a liquid-crystal display (LCD), for displaying content and menus to the user. Headless devices, such as servers in data center 108 may be managed remotely and may not include output device 240. Input device 230 and output device 240 may allow a user to activate and interact with a particular service or application, such as an SMS application, a phone application, etc. Input device 230 and output device 240 may allow a user to receive and view a menu of options and select from the menu options. The menu may allow the user to select various functions or services associated with applications executed by computing module 200.

Communication interface 250 may include a transceiver that enables computing module 200 to communicate with other devices or systems. Communication interface 250 may include a transmitter that converts baseband signals to radio frequency (RF) signals or a receiver that converts RF signals to baseband signals. Communication interface 250 may be coupled to an antenna for transmitting and receiving RF signals. Communication interface 250 may include a network interface card, e.g., Ethernet card, for wired communications or a wireless network interface (e.g., a WiFi) card for wireless communications. Communication interface 250 may also include, for example, a universal serial bus (USB) port for communications over a cable, a Bluetooth™ wireless interface, a radio-frequency identification (RFID) interface, a near-field communications (NFC) wireless interface, etc. In the case of mobile device 102, for example, communication interface 250 may employ GSM, CDMA, WCDMA, LTE, IEEE 802.11x, etc.

Memory 260 may store, among other things, information and instructions (e.g., applications 264 and operating system 262) and data (e.g., application data 266) for use by processing logic 220. Memory 260 may include a random access memory (RAM) or another type of dynamic storage device, a read-only memory (ROM) device or another type of static storage device, and/or some other type of magnetic or optical recording medium and its corresponding drive (e.g., a hard disk drive).

Operating system 262 may include software instructions for managing hardware and software resources of computing module 200. For example, in the case of safety server 108, operating system 262 may include Linux, Solaris, Windows, OS X, etc., In the case of mobile device 102, operating system 262 may include, for example, iOS, Android (e.g., Gingerbread, Honeycomb, etc.), an embedded operating system, etc. Applications 264 and application data 266 may provide network services and/or include applications, depending on the device in which the particular computing module 200 is found. For example, safety server 108 may include an application to redirect calls to voicemail when the user of mobile device 102 is driving. Mobile device 102 may include an SMS application, a phone application, etc.

Computing module 200 may perform the operations described herein in response to processing logic 220 executing software instructions stored in a computer-readable medium, such as memory 260. A computer-readable medium may include a physical and/or logical memory device. The software instructions may be read into memory 260 from another computer-readable medium or from another device via communication interface 250. The software instructions stored in memory 260 may cause processing logic 220 to perform processes that are described herein.

As described above, embodiments disclosed herein may allow for a user of mobile device 102 to drive car 104 without being distracted by the device. In one embodiment, mobile device 102, car 104, and/or safety server 108 may detect where mobile device 102 is located inside of the cabin of car 104 when, for example, the car is moving. FIG. 3A is a block diagram of exemplary components of car 104 (e.g., components of or functions performed by car 104). As shown in FIG. 3A, car 104 may include a transponder 322 and safety logic 324.

Figure 4A:
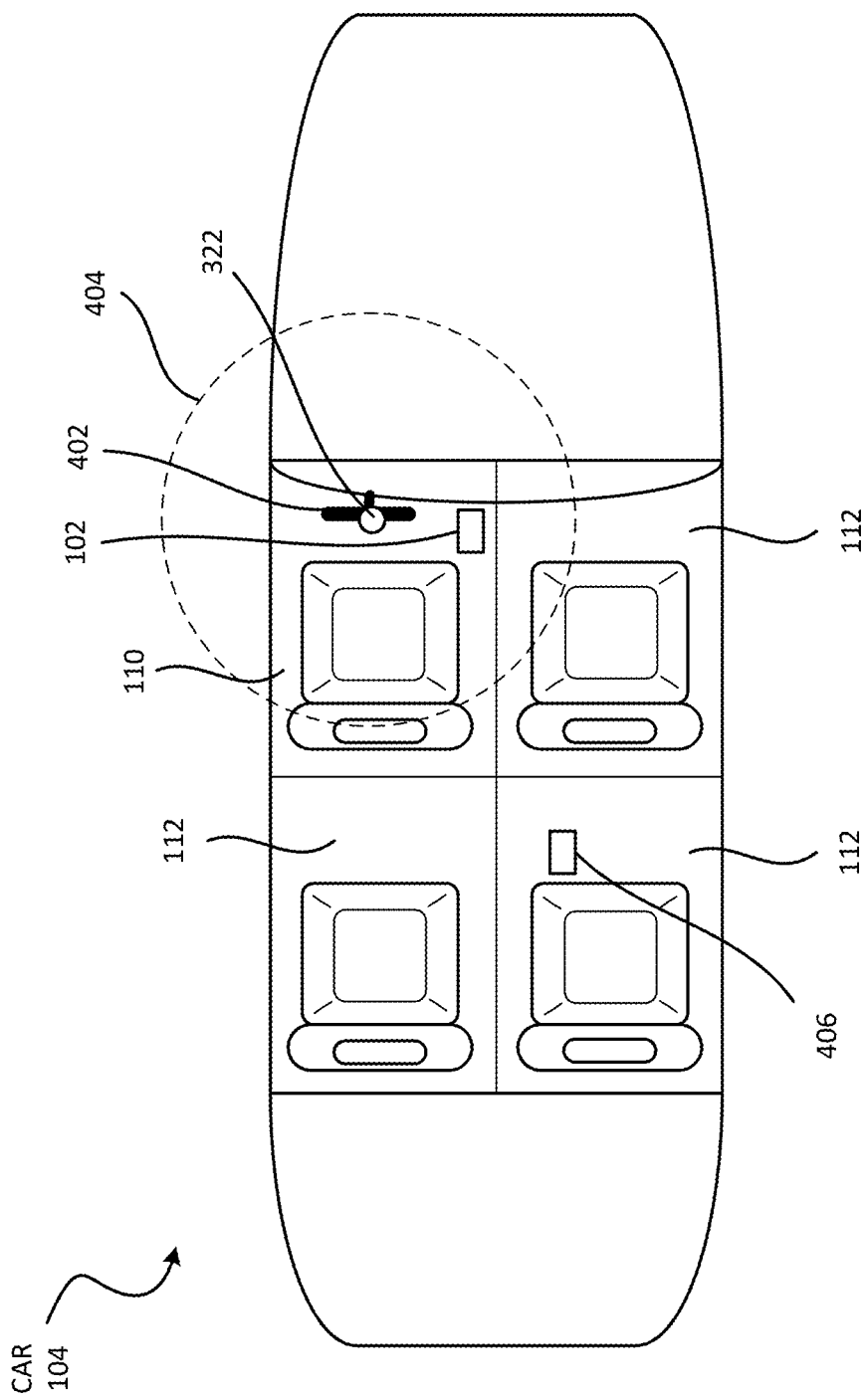
FIGS. 4A and 4B are diagrams of the car of FIG. 1.

Transponder 322 may include a transmitter that transmits, for example, signals to mobile device 102. In one embodiment, transponder transmits at a known power level. Given the known power of transmission, and the known received power, the distance between mobile device 102 and transponder 322 may be determined (e.g., by safety logic 324 in car 104, by mobile device 102, or by safety server 108). Given the distance between mobile device 102 and transponder 322, it can be determined whether mobile device 102 is in driver compartment 110. In one embodiment, transponder 322 is attached to the steering wheel of a car (e.g., attached to the center of the wheel). This exemplary positioning of transponder 322 in car 104 is shown in FIG. 4A. Similar to car 104 shown in FIG. 1, FIG. 4A shows car 104 including passenger compartments 112, driver compartment 110, and a steering wheel 402. Steering wheel 402, in this example, includes transponder 322 attached to steering wheel 402. Further, mobile device 102 is shown located in driver compartment 110 and a mobile device 406 is shown located in one of the other passenger compartments 112.

Figure 4B:
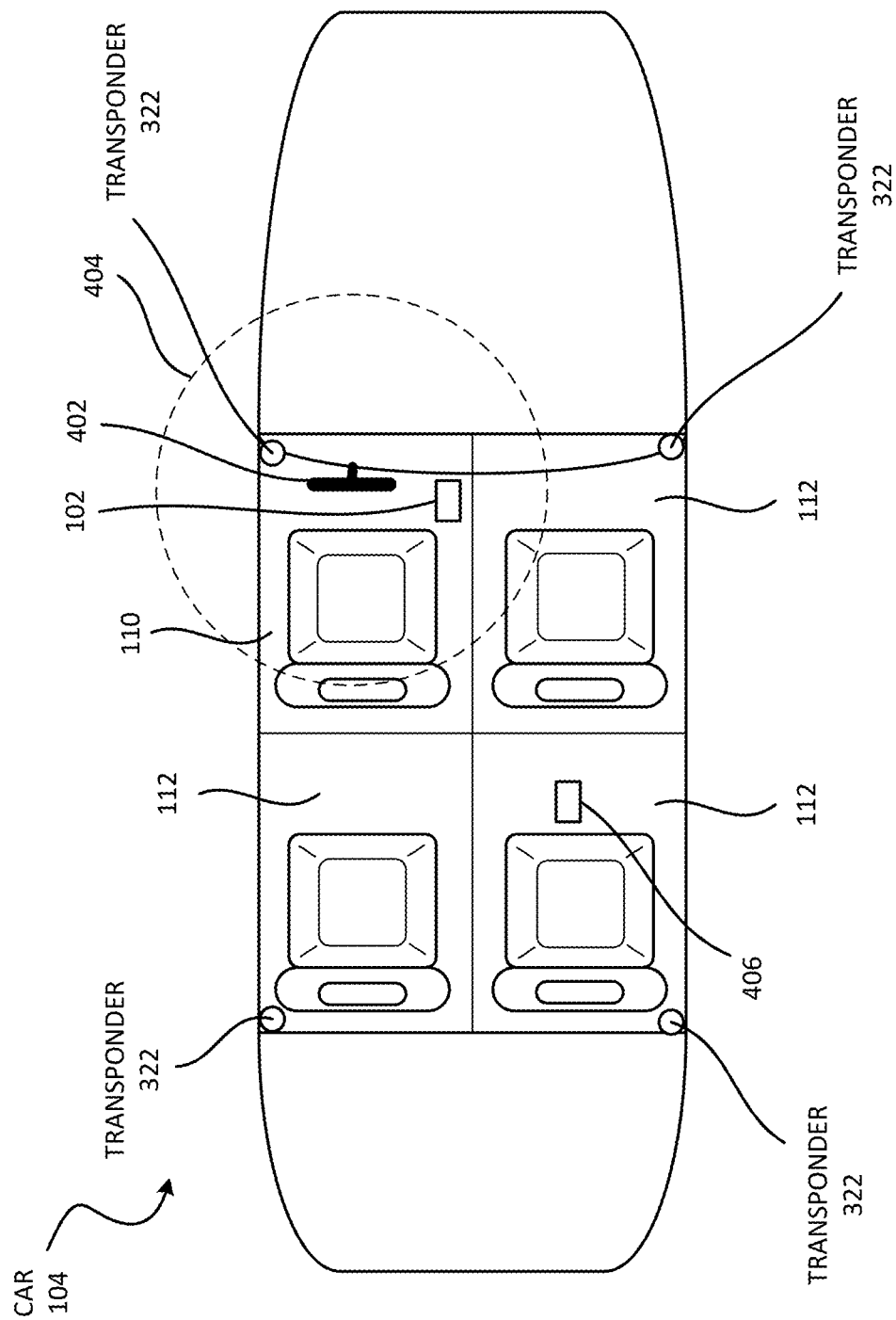

Transponder 322 may be placed in other positions in car 104, such in the corner of the passenger cabin near the driver's side view mirror. Further, more than one transponder 322 may be used. For example, FIG. 4B is a diagram of an alternative arrangement of a group of transponders 322. As shown in FIG. 4B, transponders 322 may be placed in the corner of the passenger cabin. In this configuration, triangulation may be used to determine the position of mobile device 102 more accurately. Further, parameters other than received power may be used to determine the position of mobile device 102 in car 104. For example, in one embodiment, the position of mobile device 102 may be determined by the different time of arrival of signals transmitted by transponders 322.

Transponder 322 may continuously or periodically send signals for detection by mobile device 102. In one embodiment transponder 322 transmits signals on an unused or unlicensed frequency (e.g., 2.4 GHz).

In one embodiment, safety logic 324 may determine the identity of the mobile devices (e.g., mobile device 102) in the cabin of car 104 and transmit this information to safety server 108. For example, safety logic 3324 may detect the hardware address (e.g., media-access card (MAC) address) of the mobile devices in car 104 and transmit this information to base station 106. Using this information, for example, safety server 108 may direct calls to mobile device 102 (e.g., when in driver compartment 110) to other devices in car 104.

Car 104 may include more, fewer, or a different arrangement of components than those shown in FIGS. 3B, 4A, and 4B. For example, transponder 322 may attached to the dashboard of a car rather than steering wheel 402. Car 104 may also include components that perform the functions described as being performed by mobile device 102 or safety server 108. In one embodiment, logic in car 104 may communicate with safety server 108 through mobile device 102, for example.

As discussed above, in one embodiment, mobile device 102 may determine its location in the cabin of car 104 and/or determine the limitations placed on services provided to the user. FIG. 3B is a block diagram of exemplary components of mobile device 102 (e.g., components of or functions provided by mobile device 102). As shown in FIG. 3B, mobile device 102 may include a location detector 302, a motion detector 304, transponder logic 305, safety logic 306, rule table 308, service state table 309, an SMS application 310, a phone application 312, and an email application 314.

Location detector 302 may determine or collect information to determine the location or position of mobile device 102 (e.g., the position mobile device 102 on the earth). Location detector 302 may include a Global Positioning System (GPS) device. As a GPS device, location detector 302 may receive signals from satellites to determine the location of mobile device 102. Location detector 302 may also use other location systems or methods, such as a system that determines the location of mobile device 102 relative to WiFi hotspots or cell towers and then determines the location of mobile device 102 based on known locations of the hotspots or cell towers. In one embodiment, car 104 may additionally or alternatively include location detector 302.

Motion detector 304 may measure the direction and/or motion (e.g., relative motion) of mobile device 102. Motion detector 304 may include an accelerometer (e.g., a microelectromechanical system (MEMS) accelerometer) to measure movement or acceleration. Motion detector 304 may include a gyroscope (e.g., a MEMS gyroscope) to measure rotation or orientation. Motion detector 304 may also include a compass (e.g., using the Hall effect) to measure direction.

The direction of motion detector 304 may correspond to the direction of mobile device 102, for example. Information from motion detector 304 may be used, for example, to infer the speed of car 104 that is carrying mobile device 102. In one embodiment, car 104 may additionally or alternatively include location detector 302.

Transponder logic 305 may determine the location of mobile device 102 in car 104. For example, transponder logic 305 may determine that mobile device 102 is within three feet from the steering wheel (e.g., that mobile device 102 is in driver compartment 110). In this embodiment, mobile device 102 receives a signal transmitted by transponder 322 and reports the received signal strength to transponder logic 305. Knowing the transmitted power, transponder logic 305 may determine the distance of mobile device 102 from transponder 322. In one embodiment, the transmitted power may be information carried in the signal itself. Knowing the location of transponder 322, in one embodiment, transponder logic 305 may determine whether mobile device 102 is in driver compartment 110. In one embodiment, transponder logic 305 may determine the location of mobile device 102 in car 104 based on signals received from multiple transponders (e.g., using triangulation). In this embodiment, transponders 322 may be located in each corner of the cabin of car 104, as shown in FIG. 4B. In one embodiment, mobile device 102 may detect the distance between mobile device 102 and steering wheel 402 by using a metal detector. That is, steering wheel 402 may comprise a steel ring and mobile device 102 may be able to detect the distance away from the steel ring with a metal detector, for example.

Returning to FIG. 4A, mobile device 102 (e.g., transponder logic 305) measures the power of the signal received by transponder 322 and determines whether it is in driver compartment 110 (e.g., within three feet of transponder 322 defined by a dashed circle 404). If mobile device 102 were in the location occupied by mobile device 406, then mobile device 102 may determine that it is not within three feet of transponder 322. Transponder logic 305 may infer that mobile device 102 is in driver compartment 110 when mobile device 102 is within 3 feet of transponder 322, for example.

Rules table 308 specifies the conditions or criteria for limiting services (e.g., turning services or functions on or off) of mobile device 102. For example, a rule may specify that when mobile device 102 (1) is traveling faster than 5 mph, (2) is in New Jersey, and (3) is in driver compartment 110 (e.g., less than three feet from steering wheel 402), then the text messaging service should be turned off. An example of rule table 308 is discussed below with respect to FIG. 4C.

Service state table 309 may store the current state of services and/or applications in mobile device 102 (e.g., whether the service is on, off, or otherwise limited, whether an application may launch or execute, etc.). FIG. 4D is a diagram of exemplary service state table 309. Service state table 309 may include a service field 492 and a state field 494. Service field 492 specifies the application or service. For example, service field 492 may specify "SMS app" or "phone app." As another example, service field 492 may specify "data service" (e.g., the data service provided by the operating system). State field 494 may specify whether the corresponding service is on or off or otherwise limited, for example.

Returning to FIG. 3B, safety logic 306 may receive information from sensors (e.g., location detector 302, motion detector 304, etc.), derive information from the sensors (e.g., speed, legal jurisdiction, etc.) and apply the rules specified in rules table 308 to determine what applications or functions, if any, in mobile device 102 should be limited (e.g., turned on or off). For example, safety logic 306 may input motion information from motion detector 304, location detector 302, and/or transponder logic 305. Safety logic 306 may determine that mobile device 102 is in driver compartment 110 in car 104 traveling at 20 mph in New Jersey. Applying a rule in rule table 308, safety logic 306 may turn off text messaging.

SMS application 310 allows the user of mobile device 102 to send and receive text messages. SMS application 310 receives text messages from other devices (e.g., through base station 106 from network 180) for display to the user of mobile device 102. SMS application 310 also receives user input, forming a text message, for transmission to another device (e.g., through base station 106 to network 180). In one embodiment, SMS application 310 does not display text messages or receive user input (e.g., for creating a text message) when safety logic 306 determines that text messaging should be turned off, for example.

Phone application 312 allows the user of mobile device 102 to receive and place phone calls to other devices (e.g., through base station 106 to or from network 180). Phone application 312 may allow the user to answer a phone call by selecting an "answer" soft key, for example. Phone application 312 may allow the user to place a phone call by receiving a telephone number through a keypad, for example. In one embodiment, phone application 312 does not allow for the user to answer a call or place a non-emergency call when safety logic 306 determines that phone calling should be turned off, for example.

Email application 314 allows the user of mobile device 102 to receive, read, create, and transmit emails (e.g., through base station 106 to or from network 180). Email application 314 may display a keyboard for receiving user input to generate an email. In one embodiment, email application 314 does not allow for the user to read, prepare, or send an email when safety logic 306 determines that emailing (e.g., or data services generally) should be turned off, for example.

Mobile device 102 may include more, fewer, or a different arrangement of components than shown in FIG. 3B. For example, mobile device 102 may store many other applications. Mobile device 102 may also perform functions described as performed by other devices in network 100 (e.g., such as safety server 108 or car 104).

FIG. 3C is a block diagram of exemplary components of safety server 108 (e.g., components of or functions performed by safety server 108). As shown in FIG. 3C, safety server 108 may include safety logic 342, a rules table 344, and a state table 346. Safety server 108 may include more, fewer, or a different arrangement of components than shown in FIG. 3C.

Rule table 344, like rule table 308, may specify the conditions or criteria for turning on/off service or functions of mobile device 102. For example, a rule may specify that when mobile device 102 (1) is traveling faster than 5 mph, (2) is in New Jersey, and (3) is in driver compartment 110 (e.g., less than three feet from the steering wheel), then the text messaging service should be turned off.

FIG. 4C shows an exemplary rule table 344. Rule table 344 includes a speed field 452, a distance from transponder field 454, a location field 456, a headset field 458, and a safety settings field 460. Rule table 308 of FIG. 3B, stored in mobile device 102, may be similarly configured to rule table 344.

Fields 452 through 458 may specify criteria that must be met before the settings in corresponding setting fields 460 are applied. For example, speed field 452 may specify the speed of car 104 before the settings in field 460 are applied. Distance from transponder field 454 may specify the distance of mobile device 102 from transponder 322 before the settings field 460 are applied. In this embodiment, whether mobile device 102 is in driver compartment 110 is inferred based on the distance of mobile device 102 from transponder 322. In other embodiments, whether mobile device 102 is in driver compartment 110 can be determined by other methods.

Location field 456 may specify the location (e.g., legal jurisdiction) of mobile device 102 before the settings in field 460 are applied. Headset field 458 may specify the state of use of a headset before the settings in field 460 are applied.

Rule table 344 is exemplary and may include additional, fewer, or a different arrangement of fields than shown in FIG. 4C. For example, other criteria may include the weather (e.g., rain, snow, or slippery conditions may turn off a telephone application regardless of whether a headset is being used). For example, rule table 344 may include a field to identify the mobile device (e.g., mobile device 102) for which the rules apply.

Returning to FIG. 3C, safety logic 342 may perform functions similar to those described above with respect to safety logic 306. Safety logic 342 may receive information from mobile device 102 (e.g., location detector 302, motion detector 304, etc.), derive information from the received information (e.g., speed, legal jurisdiction, etc.), and apply the rules specified in rules table 344 to determine what functions, if any, in mobile device 102 should be limited (e.g., turned on or off). For example, safety logic 342 may receive motion information from motion detector 304, location detector 302, and/or transponder logic 305 and determine that mobile device 102 is in driver compartment 110 of car 104 and traveling at 20 mph in New Jersey. Applying a rule in rule table 308, safety logic 342 may turn off text messaging in mobile device 102. Because safety logic 342 is located in safety server 108 and not mobile device 102, safety logic 342 may turn off text messaging at the network level (e.g., at base station 106) as well as or instead of at mobile device 102, for example. In one embodiment, some conditions may be determined at mobile device 102 (e.g., speed) and transmitted from mobile device 102 to safety server 108 for safety logic 342 to act upon.

As discussed above, network 100 may include more than one mobile device. As a result, safety server 108 may store the state of services related to many different mobile devices. State table 346 may store the current state of services for mobile devices in environment 100, such as mobile device 102. FIG. 4E is a diagram of an exemplary state table 346. Device state table 346 includes a device ID field 482 and a state field 484. Device state table 346 may include more, fewer, or a different arrangement of fields than shown in FIG. 4E.

Device ID field 482 specifies the identity of a mobile device. Device ID field 482 may include the telephone number, the IMEI (International Mobile Equipment Identity) number, or other identifier of the corresponding mobile device, such as mobile device 102. Two records are shown in device state table 346, a record with a device ID of 201-891-7329 (e.g., for mobile device 102) and 202-526-5487 (e.g., for mobile device 406).

State field 484 may indicate the current state of the corresponding device identified in device ID field 482. For example, as shown in exemplary device state table 346, mobile device 102 currently has SMS application 310 turned off, phone application turned off, and data services turned on. In addition, state field 484 indicates that mobile device 102 has been detected in car 104 and in driver compartment 110. As also shown in exemplary device state table 346, mobile device 406 currently has SMS application 310 turned on, phone application turned on, and data services turned on. In addition, as indicated in field 484, mobile device 406 has been detected in car 104 but, unlike mobile device 102, not in driver compartment 110.

Figure 5A:
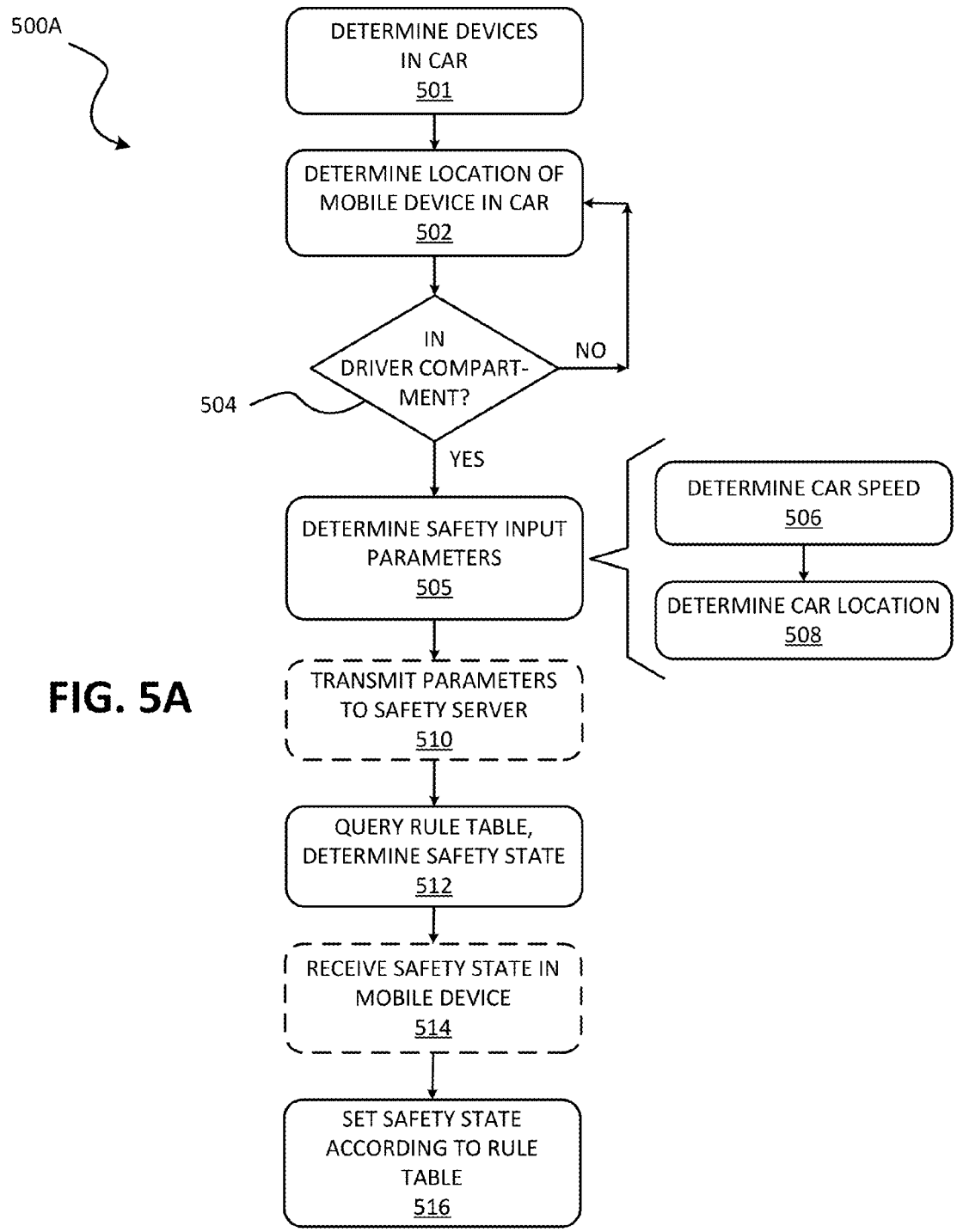
FIG. 5A is a flowchart of an exemplary process for altering the functional state of a mobile device in one embodiment.

The components of mobile device 102, car 104, and safety server 108 may be used to implement methods for determining when functions of mobile device 102 should be limited (e.g., to reduce driver distraction). FIG. 5A is a flowchart of a process 500A for selectively adjusting features of a mobile device to, for example, enhance safety. Process 500A may be executed by mobile device 102 (e.g., by safety logic 306), by safety server 108 (e.g., safety logic 342), car 104, or by one or more of those devices. Process 500A may begin with a determination of the mobile devices in car 104 (block 501). For example, safety logic 324 may determine that mobile device 102 and mobile device 406 are in car 104. In one embodiment, this information is transmitted to safety server 108. For every device in car 104, the actions in blocks 502-516 may be performed. The following description relates to mobile device 102 in car 104, although the process may also be performed for mobile device 406.

Process 500A may continue with the determination of the location of mobile device 102 device in car 104 (block 502). If mobile device 102 is not in driver compartment 110 (block 504: NO), then process 500A may return to block 502 (e.g., to continuously check when mobile device 102 enters driver compartment 110). If the location of mobile device 102 is in driver compartment 110 (block 504: YES), then other safety input parameters may be determined (block 505). Other safety input parameters may include the speed of car 104 and/or the location of car 104 (e.g., the legal jurisdiction). For example, the speed of car 104 may be determined (block 506). The speed of the car may be inferred from the speed of mobile device 102, for example. In one embodiment, location detector 302 may determine the location of mobile device 102 at different times and calculate the speed of mobile device 102. Information from motion detector 304 (e.g., an accelerometer) may also be used to infer the speed of mobile device 102. In one embodiment, safety server 108 and mobile device 102 may cooperate to determine the speed of mobile device 102 by measuring the signal strength or signal characteristics received by mobile device 102 and/or base station 106 over a period of time, for example.

As another example, the location (e.g., legal jurisdiction) of car 104 may also be determined (block 508). In this example, location detector 302 may determine the location of car 104. Safety logic 306 may then determine, for example, the State that car 104 is in (e.g., New Jersey). In one embodiment, safety server 108 may determine the location mobile device 102 (and hence car 104) by determining the base station 106 to which mobile device 102 is connected.

In one embodiment, the parameters determined in blocks 501 and 505 (e.g., location of mobile device 102 in car 104, the speed of car 104, and the location of car 104) may be transmitted to safety server 108 (block 510). In this embodiment, safety server 108 may receive these parameters and use these parameters to determine the state of services offered by mobile device 102. As discussed above, mobile device 102 may determine or help determine the safety parameters (e.g., determined at block 501 through 508) and transmission to safety server 108 may not be needed.

The corresponding rule table may be queried (e.g., with the parameters) to determine the proper safety state (block 512). For example, assume that mobile device 102 is within 3 feet of transponder 322 in car 104, car 104 is traveling more than 5 mph, and a headset is not being used. After querying rule table 344 with this information, safety server 108 may determine that, for mobile device 102, SMS application 310 should be turned off, phone application 312 should also be turned off, but data services may be kept on. Alternatively, or in addition, mobile device 102 may query rule table 308 stored in mobile device 102 to determine the desired state of mobile device 102.

In one embodiment, the safety state for mobile device 102 may be transmitted to and received by mobile device 102 (block 514). For example, safety server 108 may transmit to mobile device 102 an indication that SMS application 310 and phone application 312 should be turned off but that data may be kept on. The safety state of mobile device 102 may be set (block 516). For example, mobile device 102 may turn off SMS application 310 and phone application 312 by recording, in service state table 309, that SMS application and phone application have been turned off. Further, as part of setting the safety state, safety server 108 may store the safety state of mobile device 102 in device state table 346.

Process 500A may continuously run in mobile device 102 and/or safety server 108. Thus, the state of mobile device 102 may always be current. When the user of mobile device 102 attempts to send an SMS message or place a call, mobile device 102 may refer to service state table 309, for example, to determine whether this is allowed. When base station 106 receives an SMS message or a phone call, safety server 108 may refer to device state table 346 to determine whether to allow the message or call through to mobile device 102. Such exemplary processes are described in FIGS. 5B though 5E below.

Figure 5B:
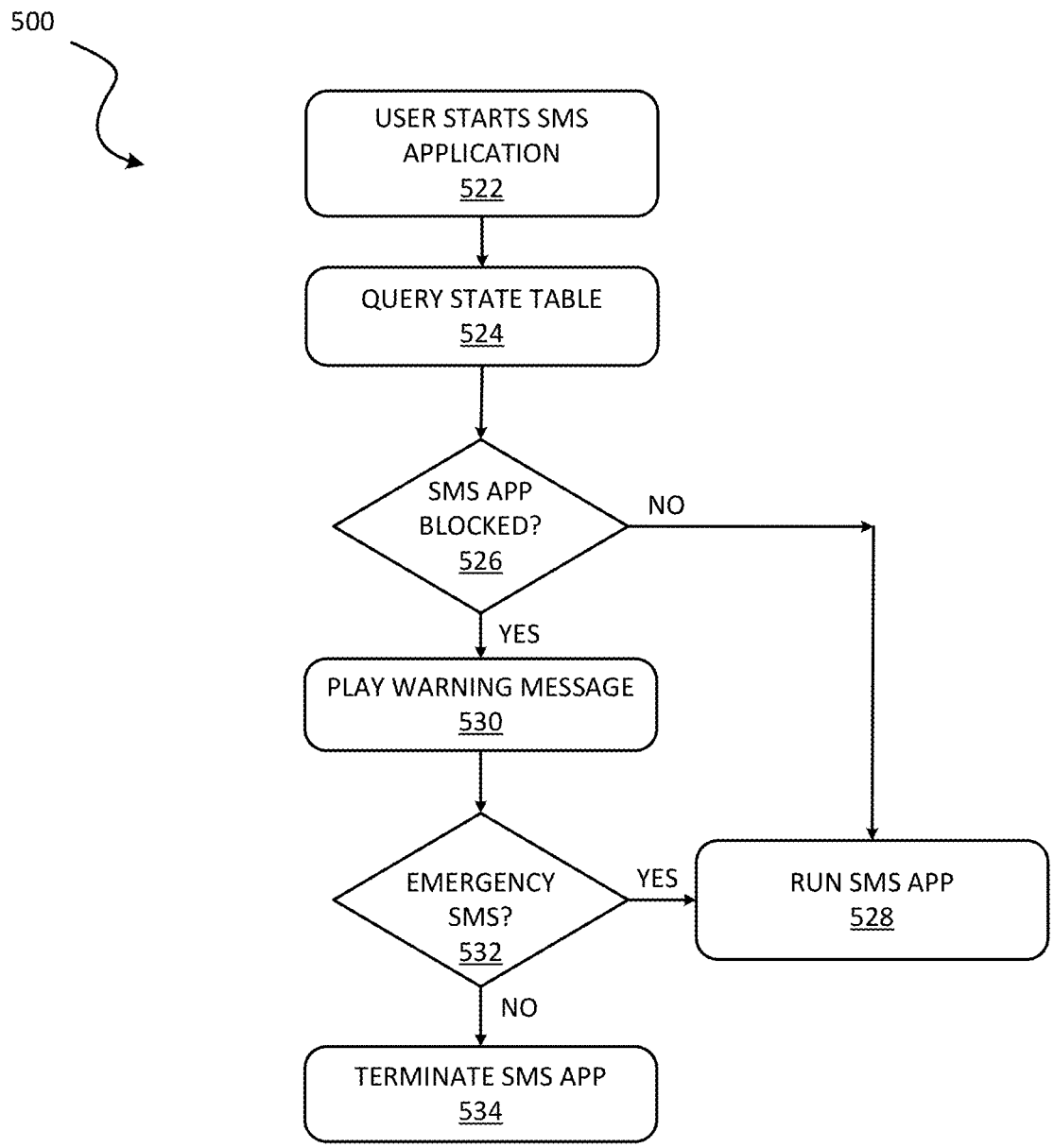
FIGS. 5B through 5E are flowcharts of exemplary processes for limiting the functionality of a mobile device in one embodiment.

FIG. 5B is a flowchart of a process 500B for sending SMS messages in one embodiment. Mobile device 102 (e.g., safety logic 306) may execute process 500B. Process 500B may begin when the user starts an SMS application (block 522). In this case, service state table 309 may be queried (block 524). If SMS application 310 is not blocked (e.g., according to service state table 309) (block 526: NO), then SMS application 310 may execute as requested by the user (block 528). If, however, SMS application 310 is blocked (block 526: YES), then mobile device 102 may play a warning message. Such a warning message may be, for example, "I'm are sorry Dave, but I'm afraid I can't do that," or "it is not safe to send a text message right now, please wait until the car stops or pass your phone to a passenger."

In one embodiment, the user may be prompted with respect to whether the SMS is an emergency SMS (e.g., to 999 or to 911) (block 530). If the SMS is an emergency message (block 532: YES), then SMS application 310 may run (e.g., albeit in a limited capacity to 911). If the message is not an emergency message (block 532: NO), then the SMS application may be terminated (block 534).

Figure 5C:
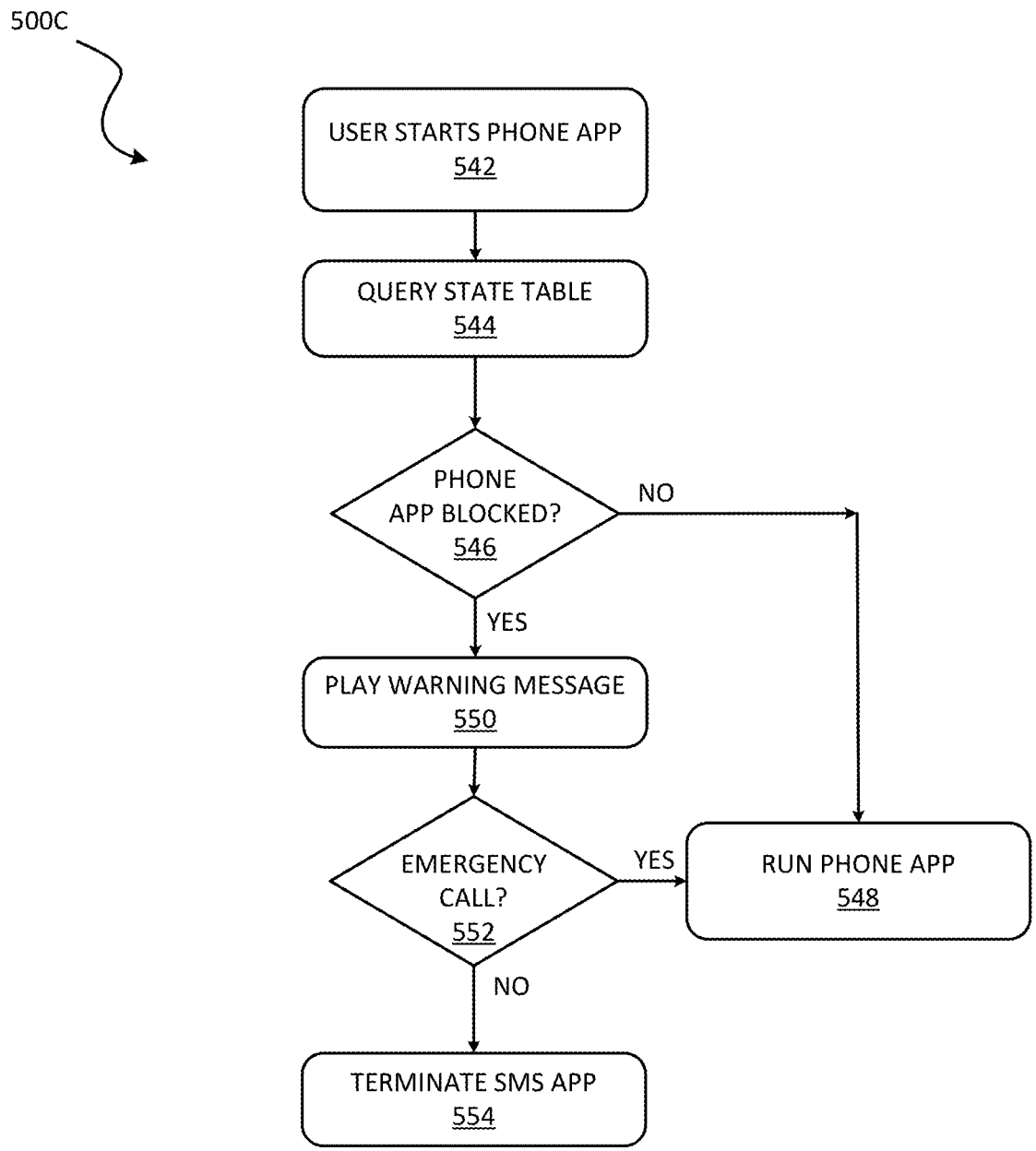

FIG. 5C is a flowchart of a process 500C for placing a phone call in one embodiment. Mobile device 102 (e.g., safety logic 306) may execute process 500C. Process 500C may begin when the user starts a phone application (block 542). In this case, service state table 309 may be queried (block 544). If phone application 312 is not blocked (e.g., according to service state table 309) (block 546: NO), then phone application 312 may execute as requested by the user (block 548). If, however, phone application 312 is blocked (block 546: YES), then mobile device 102 may play a warning message. Such a warning message may be, for example, "I'm are sorry Dave, but I'm afraid I can't do that," or "It is not safe to place a phone call right now, please wait until the car stops or pass your phone to a passenger"

In one embodiment, the user may be prompted with respect to whether the call is an emergency call (e.g., to 999 or to 911) (block 552). If the call is an emergency call (block 552: YES), then phone application 312 may run (e.g., albeit in a limited capacity to 911). If the message is not an emergency message (block 552: NO), then phone application 312 may be terminated (block 554).

Figure 5D:
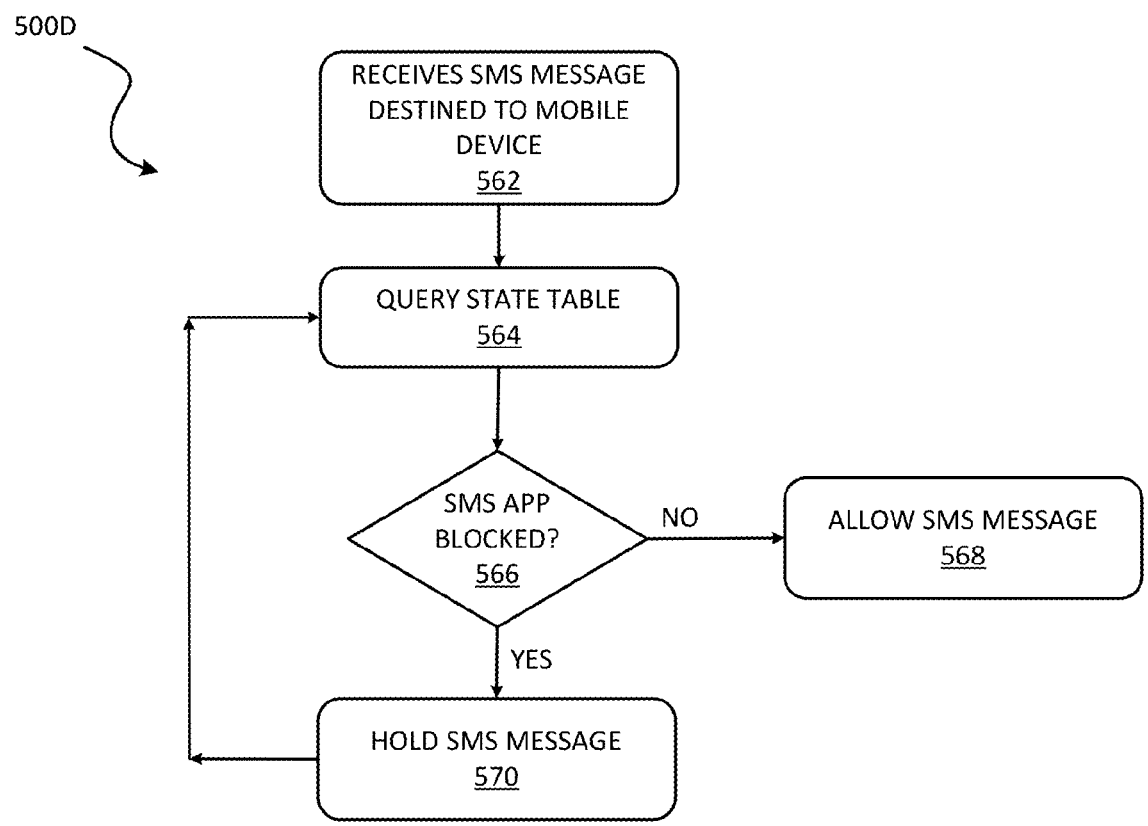

FIG. 5D is a flowchart of a process 500D for receiving an SMS message in one embodiment. Process 500D may be executed by mobile device 102 (e.g., by safety logic 2306), by safety server 108 (e.g., safety logic 342), or by both mobile device 102 and safety server 108. Process 500D begins with the receipt of an SMS message destined to mobile device 102 (block 562). The state table (e.g., service state table 309 or device state table 346) may be queried (block 564) to determine whether SMS application 310 has been turned off. In the embodiment in which the SMS message is received in base station 106 (block 562), then device state table 346 may be queried (block 564). In the embodiment in which the SMS message is received in mobile device 102 (block 562), then service state table 309 may be queried (block 564).

If the SMS application is not blocked (block 566: NO), then the SMS message may be allowed (block 568). In the embodiment in which base station 106 has received the message, then the SMS message may be sent to mobile device 102 for display to the user (e.g., using SMS application 310). In the embodiment in which mobile device 102 has already received the SMS message, then SMS application 310 may display the SMS message to the user.

If the SMS application is blocked (block 566: YES), then the SMS message may be held (block 568). In the embodiment in which base station 106 has the message, then the SMS message may stored in safety server 108, for example. In the embodiment in which mobile device 102 has already received the SMS message, then the user may not be alerted that an SMS message has arrived and the SMS message may not be displayed, for example. Process 500D may then continue to block 564 where the state may be continuously checked until SMS application 310 is no longer blocked (block 566: NO), in which case the message is allowed to reach the user (e.g., it is forwarded by safety server 108 to mobile device 102 and/or displayed by SMS application 310).

Figure 5E:
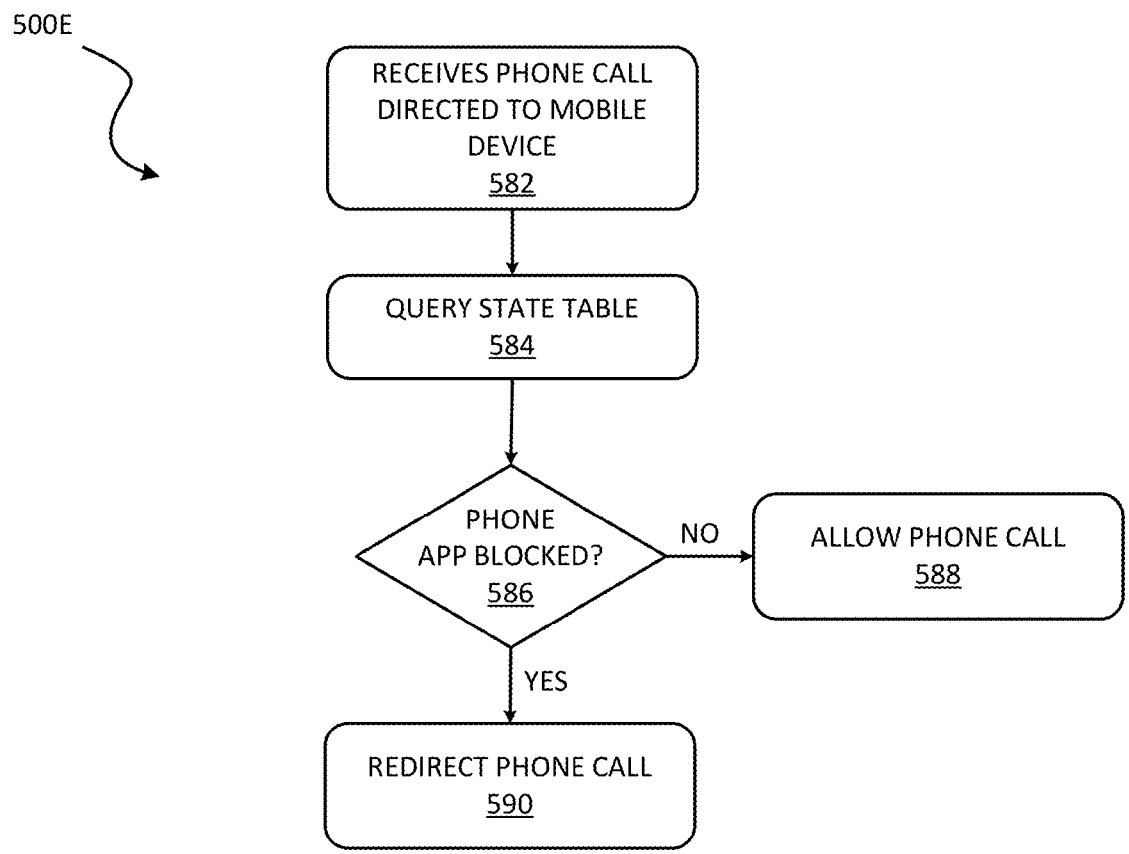

FIG. 5E is a flowchart of a process 500E for receiving a phone call in mobile device 102 in one embodiment. Process 500E may be executed by mobile device 102 (e.g., by safety logic 2306), by safety server 108 (e.g., safety logic 342), or by both mobile device 102 and safety server 108, for example. Process 500E begins with the receipt of a phone call directed to mobile device 102 (block 582). The state table (e.g., service state table 309 or device state table 346) may be queried (block 584) to determine whether phone application 312 has been turned off or not. In the embodiment in which the phone call is intercepted in safety server 108 (block 582), then device state table 346 may be queried (block 584). In the embodiment in which the phone call is received in mobile device 102 (block 582), then service state table 309 may be queried (block 584).

If the phone application is not blocked (block 586: NO), then the phone call may be allowed (block 588). In the embodiment in which base station 106 is routing the call, then the phone call may be sent to mobile device 102 for the user to answer or not. In the embodiment in which mobile device 102 has received indication of the phone call, then mobile device 102 may ring to inform the user of the incoming phone call, for example.

If the phone application is blocked (block 586: YES), then the incoming call may be redirected (block 590). In the embodiment in which base station 106 is routing the call, then safety server 108 may redirect the call to voicemail, for example. In the embodiment in which mobile device 102 has already received an indication of the phone call, then mobile device 102 may redirect the call to voicemail. In one embodiment, before the user's voicemail message is played, an informational message (e.g., "sorry, the user is driving") may be played to the incoming caller.

In one embodiment, according to device state table 346, the call may be rerouted to another device in car 104. For example, the call may be rerouted to mobile device 406, which is also in car 104. This rerouting to mobile device 406 is possible because car 104 is aware of the mobile devices in car 104 and which devices are in driver compartment 110. This information has also been transmitted to safety server 108, which can then redirect calls to a different phone in the same car 104.

Figure 6:
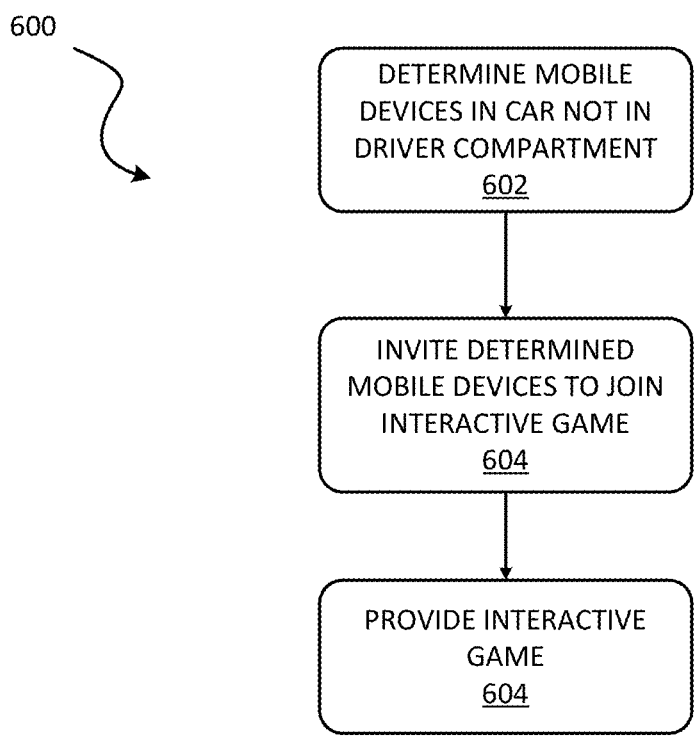
FIG. 6 is a flowchart of the discovery of user devices for an interactive game while traveling in a car.

FIG. 6 is a flowchart of an exemplary process 600 for occupants of car 104 to play an interactive game. In this embodiment, safety server 108 is aware of the mobile devices in car 104 that are not in driver compartment 110 (block 602). Thus, safety server 108 may invite the users of these mobile devices to join in an interactive travel game (block 604). Assuming all the users of the determined mobile devices accept the invitation, network 100 may provide an interactive game to those users.

For example, the occupants of car 104 traveling on vacation may be invited to join a trivia game, competing against each other. The trivia questions may be geared toward local historical events, for example, as car 104 travels to different locations. Occupants of car 104 may compete against each other. The driver of car 104, however, is not asked to join as he or she is driving and should not be distracted. In one embodiment, the user(s) of mobile device(s) in car 104 (e.g., those not in driver compartment 110) may be presented with a historical tour of the areas being traveled through (e.g., non-interactive)

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, to determine the location of mobile device 102, transponder(s) 322 may receive signals transmitted by mobile device 102 (rather than vice versa). In this embodiment, mobile device 102 may transmit signals at a known power level and the distance may be determined by the power level received at the one or more transponder(s) 322.

Further, certain portions of the invention may be implemented as logic that performs one or more functions. This logic may include hardware, such as an application specific integrated circuit, a field programmable gate array, a processor, or a microprocessor, or a combination of hardware and software.

No element, act, or instruction used in the description of the present application should be construed as critical or essential to the invention unless explicitly described as such. Also, as used herein, the articles "a" and the term "one of" are intended to include one or more items. Further, the phrase "based on" is intended to mean "based, at least in part, on" unless explicitly stated otherwise.

What is claimed is:

1. A method comprising:
   determining whether each of a plurality of mobile communication devices is in a driver compartment of an automobile;
   determining whether the automobile is in motion or not in motion;

redirecting a call to one of the mobile communication devices when determined that the one of mobile communication devices is in the driver compartment and the automobile is in motion; and
transmitting an invitation to two of the mobile communication devices to play an interactive game, when determined that each of the two of the mobile communication devices is not in the driver compartment of the automobile.

2. The method of claim 1, further comprising:
holding a short-message system (SMS) message destined to the one of the mobile communication devices when determined that the one of the mobile communication devices is in the driver compartment and the automobile is in motion; and
releasing the SMS message destined to the one of the mobile communication devices when determined that the one of the mobile communication devices is no longer in the driver compartment or the automobile is no longer in motion.

3. The method of claim 1, further comprising
blocking a user from placing a call or blocking the user from generating a SMS message when the one of the mobile communication devices is in the driver compartment and the automobile is in motion.

4. The method of claim 1, wherein redirecting includes redirecting the call to another one of the mobile communication devices in the automobile.

5. The method of claim 4, further comprising:
determining whether the other one of the mobile communication devices in the automobile is in the driver compartment of the automobile and wherein redirecting the call includes redirecting the call to the other one of the mobile communication devices only when the other one of the mobile communication devices is not in the driver compartment of the automobile.

6. The method of claim 1, wherein determining whether the one of the mobile communication devices is in the driver compartment includes determining a distance that the one of the mobile communication devices is away from a transponder in the automobile.

7. The method of claim 6, wherein determining the distance the one of the mobile communication device is away from the transponder includes detecting a received signal strength of a signal transmitted by the transponder.

8. The method of claim 6, wherein determining the distance includes determining the distance that the one of the mobile communication devices is away from a steering wheel of the automobile, wherein the steering wheel includes the transponder.

9. The method of claim 1,
wherein determining whether the one of the mobile communication devices is in the driver compartment includes determining a distance that the one of the mobile communication devices is away from a steering wheel, and
wherein determining the distance that the one of the mobile communication devices is away from the steering wheel includes detecting steel in the steering wheel.

10. The method of claim 1, wherein determining whether the one of the mobile communication devices is in the driver compartment includes determining a distance that the one of the mobile communication devices is away from a plurality of transponders in the automobile.

11. A system comprising:
a memory to store instructions for execution by a processor; and
a processor to execute the instructions to:
determine whether each of a plurality of mobile communication devices is in a driver compartment of an automobile;
determine whether the automobile is in motion or not in motion;
redirect a call destined to one of the mobile communication devices, hold a short-message system (SMS) message destined to the one of the mobile communication devices, block a user from placing a call from the one of the mobile communication devices, or block the user from generating a SMS message from the one of the mobile communication devices when determined that the one of the plurality of mobile communication devices is in the driver compartment and the automobile is in motion; and
transmit an invitation to two of the mobile communication devices to play an interactive game, when determined that each of the two of the mobile communication devices is not in the driver compartment of the automobile.

12. The system of claim 11, wherein the processor is configured to release the SMS message destined to the one of the mobile communication devices when the one of the mobile communication devices is no longer in the driver compartment or the automobile is no longer in motion.

13. The system of claim 11, wherein the processor is configured to redirect the call to another one of the mobile communication devices in the automobile.

14. The system of claim 13, wherein the processor is configured to determine whether the other one of the mobile communication devices in the automobile is in the driver compartment of the automobile and to redirect the call to the other one of the mobile communication devices only when the other one of the mobile communication devices is not in the driver compartment of the automobile.

15. The system of claim 11, wherein the processor is configured to determine whether the one of the mobile communication devices is in the driver compartment by determining a distance that the one of the mobile communication devices is away from a transponder in the automobile.

16. The system of claim 15, wherein the processor is configured to determine the distance the one of the mobile communication devices is away from the transponder by detecting a received signal strength of a signal transmitted by the transponder.

17. The system of claim 15, wherein the processor is configured to determine the distance the one of the mobile communication devices is away from the transponder by determining the distance that the one of the mobile communication device is away from a steering wheel of the automobile, wherein the steering wheel includes the transponder.

18. The system of claim 11, wherein the processor is configured to determine whether the one of the mobile communication devices is in the driver compartment by determining a distance the one of the mobile communication devices is away from a steering wheel by detecting steel in the steering wheel.

19. The system of claim 11, wherein the processor is configured to determine whether the one of the mobile communication devices is in the driver compartment by determining a distance that the one of the mobile communication devices is away from a plurality of transponders in the automobile.

20. The system of claim 11, wherein the processor is configured to execute the instructions to redirect the call to voicemail when determined that the one of the mobile communication devices is in the driver compartment and the automobile is in motion.

21. The method of claim 1, wherein redirecting the call destined to the one of the mobile communication devices includes forwarding the call to voicemail.

22. The method of claim 1,
wherein transmitting an invitation includes transmitting an invitation to the two of the mobile communication devices to play an interactive game, when determined that each of the two of the communication devices is not in the driver compartment of the automobile and the automobile is in motion.

23. The method of claim 22, wherein determining whether each of the plurality of communication devices is in the driver compartment of the automobile includes determining a distance that each of the mobile communication devices is away from a transponder in the automobile.

24. The method of claim 1, wherein determining whether the automobile is in motion or not in motion includes determining a plurality of locations of the one of the mobile communication devices based on one or more known locations of one or more base stations communicating with the one of the mobile communication devices.

25. The device of claim 11, wherein the processor is further configured to:
  determine a plurality of locations of the one of the mobile communication devices based on one or more known locations of one or more base stations communicating with the one of the mobile communication devices;
  determine whether the automobile is in motion or not in motion based on the plurality of locations; and
  determining a distance that each of the mobile communication devices is away from a transponder in the automobile.

* * * * *